US010554300B2

(12) United States Patent
Smith et al.

(10) Patent No.: US 10,554,300 B2
(45) Date of Patent: Feb. 4, 2020

(54) OPTICAL COMMUNICATIONS

(71) Applicant: BRITISH TELECOMMUNICATIONS PUBLIC LIMITED COMPANY, London (GB)

(72) Inventors: Kevin Smith, London (GB); Yu Zhou, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 16/092,524

(22) PCT Filed: Apr. 10, 2017

(86) PCT No.: PCT/EP2017/058555
§ 371 (c)(1),
(2) Date: Oct. 10, 2018

(87) PCT Pub. No.: WO2017/178431
PCT Pub. Date: Oct. 19, 2017

(65) Prior Publication Data
US 2019/0173578 A1 Jun. 6, 2019

(30) Foreign Application Priority Data

Apr. 11, 2016 (EP) ........................................ 1616478
Oct. 7, 2016 (GB) .................................... 1617098.7

(51) Int. Cl.
*H04B 10/08* (2006.01)
*H04B 10/079* (2013.01)
(Continued)

(52) U.S. Cl.
CPC ..... *H04B 10/07953* (2013.01); *H04B 10/075* (2013.01); *H04B 10/2507* (2013.01); *H04L 1/0046* (2013.01); *H04L 1/203* (2013.01)

(58) Field of Classification Search
CPC .......... H04B 10/07953; H04B 10/0775; H04B 10/0793; H04B 10/0795; H04B 10/075;
(Continued)

(56) References Cited

U.S. PATENT DOCUMENTS 7,149,424 B2 * 12/2006 Kamalov .......... H04B 10/07953
398/27
7,280,768 B2 * 10/2007 Zaacks ............. H04B 10/07953
398/159
(Continued)

FOREIGN PATENT DOCUMENTS

| WO | 2006/008321 | 1/2006 |
| WO | 2012/119364 | 9/2012 |
| WO | 2015/014405 | 2/2015 |

OTHER PUBLICATIONS

Search Report dated Oct. 21, 2016, issued in Application No. GB1606117.8 (7 pages).
(Continued)

*Primary Examiner* — Hibret A Woldekidan
(74) *Attorney, Agent, or Firm* — Nixon & Vanderhye P.C.

(57) ABSTRACT

The present invention provides a method of indirectly determining the optical signal-noise ratio of an optical fibre communications link. In a test environment, the relationship between OSNR and pre-FEC BER (forward error-corrected bit error rate) is determined for a particular type of optical transponder. When a transponder of that type is connected to an optical communications link then the pre-FEC BER can be measured and the OSNR inferred from the pre-determined OSNR-BER relationship. The OSNR value can then be used to select a transponder modulation format or other transmission parameters.

26 Claims, 14 Drawing Sheets

(51) Int. Cl.
*H04B 10/2507* (2013.01)
*H04B 10/075* (2013.01)
*H04L 1/00* (2006.01)
*H04L 1/20* (2006.01)

(58) Field of Classification Search
CPC ............ H04B 10/2507; H04B 10/0799; H04L 1/0046; H04L 1/203; H04L 1/20
USPC .............................................. 398/25, 26, 27
See application file for complete search history.

(56) References Cited

U.S. PATENT DOCUMENTS

| | | | | |
|---|---|---|---|---|
| 8,041,212 B2* | 10/2011 | Gottwald | ................... | H04L 1/20 398/194 |
| 8,655,170 B2* | 2/2014 | Shukunami | ...... | H04B 10/07953 398/25 |
| 10,038,494 B1* | 7/2018 | Paraschis | ........... | H04B 10/0793 |
| 2002/0039217 A1* | 4/2002 | Saunders | ......... | H04B 10/25137 398/147 |
| 2002/0048062 A1* | 4/2002 | Sakamoto | .......... | H04B 10/0775 398/30 |
| 2004/0037569 A1 | 2/2004 | Kamalov et al. | | |
| 2007/0009259 A1* | 1/2007 | Dragovic | ........... | H04B 10/0775 398/27 |
| 2008/0256421 A1* | 10/2008 | Gerstel | ............... | H03M 13/353 714/776 |
| 2009/0254317 A1 | 10/2009 | Grigoryan et al. | | |
| 2010/0178059 A1* | 7/2010 | Shou | .................... | H04B 10/695 398/136 |
| 2013/0142508 A1* | 6/2013 | Bottari | .................... | H04J 14/02 396/26 |
| 2013/0209091 A1 | 8/2013 | Mateosky et al. | | |
| 2014/0314415 A1* | 10/2014 | Vassilieva | ........... | H04J 14/0227 398/76 |
| 2015/0139639 A1* | 5/2015 | Park | ....................... | H04B 10/40 398/27 |
| 2015/0365165 A1 | 12/2015 | Rasmussen et al. | | |
| 2016/0164626 A1* | 6/2016 | Cavaliere | .............. | H04L 1/0006 398/183 |

OTHER PUBLICATIONS

Extended European Search Report dated Oct. 18, 2016, issued in Application No. 16164748.2 (8 pages).
Oda, et al., "Optical Performance Monitoring for Dynamic and Flexible Photonic Networks", Proceedings of SPIE, vol. 9388, 2015 (9 pages).
Lee, et al. "A Review of the Polarization-Nulling Technique for Monitoring Optical-Signal-to-Noise Ratio in Dynamic WDM Networks", A Review of the Polarization-Nulling Technique for Monitoring Optical-Signal-to-Noise Ratio in Dynamic WDM Networks, Journal of Lightwave Technology, vol. 24, No. 11, Nov. 2006 (10 pages).
Moench, "Measuring the Optical Signal-to-Noise Ratio in Agile Optical Networks", Optical Fiber Communication (OFC 2007), Collocated National Fiber Optic Engineers Conference, Anaheim CA, Mar. 25-29, 2007 (6 pages).
International Search Report for PCT/EP2017/058555 dated Jul. 10, 2017, 3 pages.

* cited by examiner

OPTICAL COMMUNICATIONS

This application is the U.S. national phase of International Application No. PCT/EP2017/058555 filed Apr. 10, 2017 which designated the U.S. and claims priority to EP Patent Application No. 16164748.2 filed Apr. 11, 2016 and GB Patent Application No. 1617098.7 filed Oct. 7, 2016, the entire contents of each of which are hereby incorporated by reference.

FIELD OF THE INVENTION

The present invention relates to optical communications, and in particular a method of determining the transmission characteristics of an optical communications network.

BACKGROUND TO THE INVENTION

Conventional optical communication networks operate by sending light pulses of a predetermined period, for example such that a pulse represents a '1' and no pulse represents a '0'. This technique enables signals to be sent at data rates of up to 10 Gb/s and wavelength division multiplexing (WDM) techniques can be used to send multiple signals over a single fibre. Dense WDM (DWDM) enables around 80 wavelengths to be used such that a single fibre can potentially carry Tb/s of data. In order to enable compatibility between network components from different vendors, the ITU has specified a grid of wavelengths that are used in DWDM systems (see ITU-T G.694.1). One of the transmission phenomena present in optical fibres is chromatic dispersion, which causes the transmitted pulse to spread out, such that it becomes difficult to recover the transmitted signal at the receiver. The effects of dispersion can be mitigated by installing dispersion compensating modules (DCMs) into the network, but this adds to the cost and the complexity of the network.

Coherent optical transmission systems are thought to provide the best option for transmitting data at a rate in excess of 40 Gb/s. Coherent optical transmission systems are similar to the transmission systems used in wireless systems. Rather than only turning an optical transmitter on and off to generate a pulse, an optical signal is modulated, for example in terms of both phase and amplitude, with a data signal. At the receiver end, coherent detection is used with a local laser oscillator to recover the transmitted data, both phase and amplitude components. Dispersion can be compensated for electronically using Digital Signal Processing (DSP) in the receiver.

As data transmission rates increase further, for example beyond 100 Gb/s, then the optical signals required to transmit such data rates may not fit into the 50 GHz grid of wavelengths that are defined in the DWDM specifications. It is preferred, for reasons of flexibility and spectral efficiency, that for such high data rates, network operators are able to determine which regions of the optical transmission window are used to transmit specific signals. A single coherent optical signal, for example one having a data rate of 100 Gb/s or greater, may extend across the 50 GHz spectrum window in a conventional 50 GHz grid-based network. In comparison, flexible grid, or 'flexgrid' networks can transmit higher speed (Tb/s) optical signals using a wavelength range that is convenient for the network operator. Flexgrid networks achieve very high spectral efficiency and allow increased utilisation of fibre infrastructure (up to ~50% more than grid-based DWDM). In flexgrid networks an optical channel is no longer a single wavelength, but is defined as a single capacity entity comprising one or more sub-channels which together form an aggregate optical capacity often referred to as a 'superchannel' which can be configured and managed throughout the optical network infrastructure.

Currently deployed optical transponders operate at data rates of 2.5, 10, 40, 100 and 200 Gbit/s, will soon reach rates of 400 Gbit/s and beyond as capacity demands increase. In recent years, there has been significant research and development in the use of both advanced modulation formats (e.g. QPSK, 16-QAM, 64-QAM) and variable baud rates (25, 33.3, 50 Gbaud), in order to increase the fundamental net bit-rates of individual subcarriers generated by the optical transponders. Increasingly, the very latest optical transponders (or optical superchannel generators) are capable of changing their modulation format and/or baud rate configurations under direct software control, which allows a rapid configuration of optical bit-rates. Currently, with state-of-the-art transponders, this takes place on timescales on the order of ~10 seconds, though it is anticipated that these timescales will decrease significantly in the near future, as the technology becomes more mature and adopted in the field.

For a given capacity requirement, the preferred superchannel format (group of sub-channels) depends on the rate and reach requirements of the optical link in question. Table 1 below shows typical rate-reach characteristics that can be expected for different modulation formats and baud rates that are likely to be deployed in the near future.

TABLE 1

Comparison of modulation format properties

| Modulation Format | Bits per symbol (single/double polarisation) | Net baud rate (Gbit/s) | Subcarrier data rate (Gbit/s) | Typical Reach (km) | Typical OSNR requirement (dB) |
|---|---|---|---|---|---|
| BPSK | 1/2 | 25 | 50 | 5000 | 10 |
| QPSK | 2/4 | 25 | 100 | 2000 | 12 |
| QPSK | 2/4 | 50 | 200 | 1000 | 18 |
| 16-QAM | 4/8 | 25 | 200 | 600 | 20 |
| 64-QAM | 6/12 | 33 | 400 | 160 | 26 |

It should be noted that as data rates are increased, the OSNR requirements increase dramatically, with a corresponding decrease in network reach.

FIG. 1 shows a schematic depiction of three options for creating a superchannel having a capacity of 400 Gbit/s. For long reach applications, the superchannel configuration depicted in FIG. 2(a) of 4×100 Gbit/s (QPSK) sub-channels would be required, giving a total spectral width of ~150 GHz. Ideally, bearing in mind the need to optimise the efficiency of fibre capacity and optical spectrum, it would be preferable to use more spectrally efficient schemes such as the use of 2×200 Gbit/s (16-QAM) sub-channels (FIG. 2(b)) which takes up a spectral width of ~75 GHz, but owing to its limited reach (~600 km) this may not be feasible. For very short distance applications, perhaps on the order of 100-200 km, then the example illustrated in FIG. 2(c) could be used, which illustrates a single carrier variant of 400 Gbit/s (33.3 Gbaud, 64-QAM in this case) with a spectral width of ~50 GHz. For shorter distances this single carrier option is a highly attractive option.

As an example, consider how a 400 Gbit/s superchannel could be configured for a given optical link. In the calculations, a link OSNR ($L_{OSNR}$) of 20 dB is assumed and the OSNR requirements of the various transponder formats ($T_{OSNR}$) are as set out in Table 1 above. Factors included in the $T_{OSNR}$ value are usually back-to-back transponder performance (no transmission link) as well as linear transmission impairments such as dispersion, PMD and optical filtering). A safe operating margin ($O_{OSNR}$), is assumed to be ~2 dB, but could be any number that from a long term operational perspective is assumed to be viable to ensure stable error-free operation at end of life specifications. Operational margin usually includes such effects as transponder aging, optical link aging and potentially non-linear degradation.

According to the following simple rules, we can then work out which transponder formats will be allowed for acceptable long term performance:

$L_{OSNR} - (T_{OSNR} + O_{OSNR}) > 0 \rightarrow$ ALLOWED $L_{OSNR} - (T_{OSNR} + O_{OSNR}) \sim 0 \rightarrow$ MARGINAL $L_{OSNR} - (T_{OSNR} + O_{OSNR}) < 0 \rightarrow$ NOT ALLOWED The output of these simple rules is shown below in Table 2, along with the modulation format parameters from Table 1, and demonstrates that only two of the five modulation formats meet the optical performance and operational expectations (assuming a link OSNR of ~19 dB, for example), and that a further modulation format has a marginal performance.

TABLE 2

Comparison of modulation format properties with suitability for a particular link

| Modulation Format | Bits per symbol (single/double polarisation) | Net baud rate (Gbit/s) | Subcarrier data rate (Gbit/s) | Typical Reach (km) | Typical OSNR requirement (dB) | OUTCOME |
|---|---|---|---|---|---|---|
| BPSK | 1 | 25 | 50 | 5000 | 10 | ALLOWED |
| QPSK | 2 | 25 | 100 | 2000 | 12 | ALLOWED |
| QPSK | 2 | 50 | 200 | 1000 | 18 | MARGINAL |
| 16-QAM | 4 | 25 | 200 | 600 | 20 | NOT ALLOWED |
| 64-QAM | 6 | 33 | 400 | 160 | 26 | NOT ALLOWED |

Thus it can be seen that we have a choice of up to 3 different modulation formats, likely to be either the 25 Gbaud/100 Gbit/s QPSK or 50 Gbaud/200 Gbit/s QPSK formats, as the 25 Gbaud/BPSK is least spectrally efficient and requires the most number of ports/sub-channels. As 50 Gbaud/200 Gbit/s QPSK is viewed as marginal from a longer term operation perspective, then the preferred choice is likely to be 25 Gbaud/100 Gbit/s QPSK.

SUMMARY OF THE INVENTION

According to a first aspect of the invention, there is provided a method of determining the performance of an optical communications link, the method comprising the steps of: i) determining an OSNR (optical signal to noise ratio) to BER (bit error rate) relationship for an optical transponder; ii) connecting the optical transponder to an optical communications link; iii) measuring the bit error rate of the optical communications link; and iv) determining the OSNR for the optical communications link in accordance with the relationship determined in step i) and the measurement made in step iii).

The BER may be a pre-forward error correction (FEC) bit error rate. The OSNR-BER relationship may be determined from a plurality of OSNR-BER relationships each of which has been determined for one of a plurality of transponder modulation formats. Furthermore, the OSNR-BER relationship may be determined from a plurality of OSNR-BER relationships, each of which has been determined for one of a plurality of transponder data rates. The bit error rate of the optical communications link may be the average of a plurality of bit error rate measurements, wherein each of the plurality of bit error rates was measured with a different modulation format. The OSNR-BER relationship may be determined from a plurality of OSNR-BER relationships each of which has been determined for one of a plurality of optical transponders of the same type.

The method may comprise the additional step of v) selecting a modulation format for use by the optical transponder in accordance with the OSNR determined for the optical communications link in step iv). The method may also comprise the further step of vi) selecting one or more transmission parameters in accordance with the OSNR determined for the optical communications link in step iv).

According to a second aspect of the invention, there is provided an apparatus comprising an optical transmitter and an optical receiver, which when connected via an optical communications link are configured to perform a method as described above.

According to a third aspect of the invention, there is provided data carrier device comprising computer executable code for performing a method as described above.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Assuming that a potential optical path for the capacity demand has been found, e.g., using a network planning tool, critical to the above analysis is the derivation of a reliable value for the OSNR of the optical link ($L_{OSNR}$). In coherent optical systems linear transmission effects, such as chromatic dispersion and PMD, can be almost completely compensated by digital signal processing (DSP) in the optical transponders. Hence the OSNR of the transmission link is the key performance parameter that determines the optical performance of these optical systems.

Figure 1:
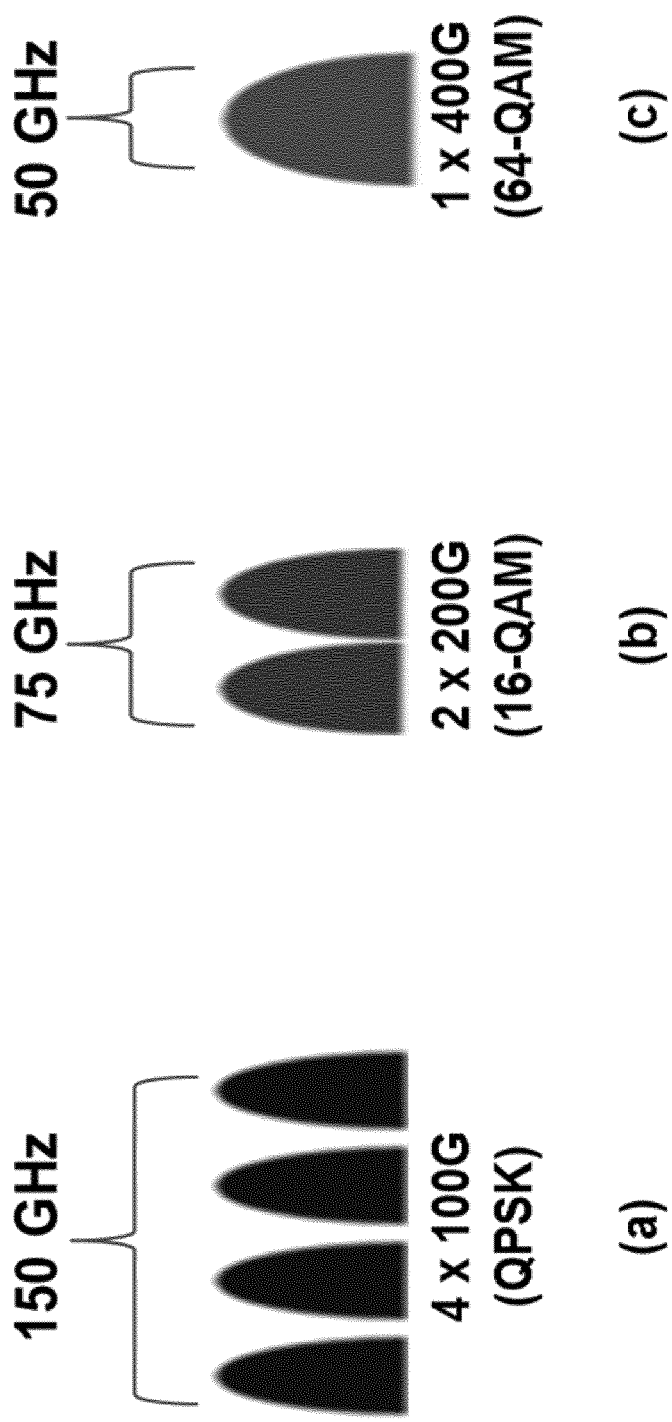
FIG. 1 shows a schematic depiction of three options for creating a superchannel having a capacity of 400 Gbit/s.
Figure 2:
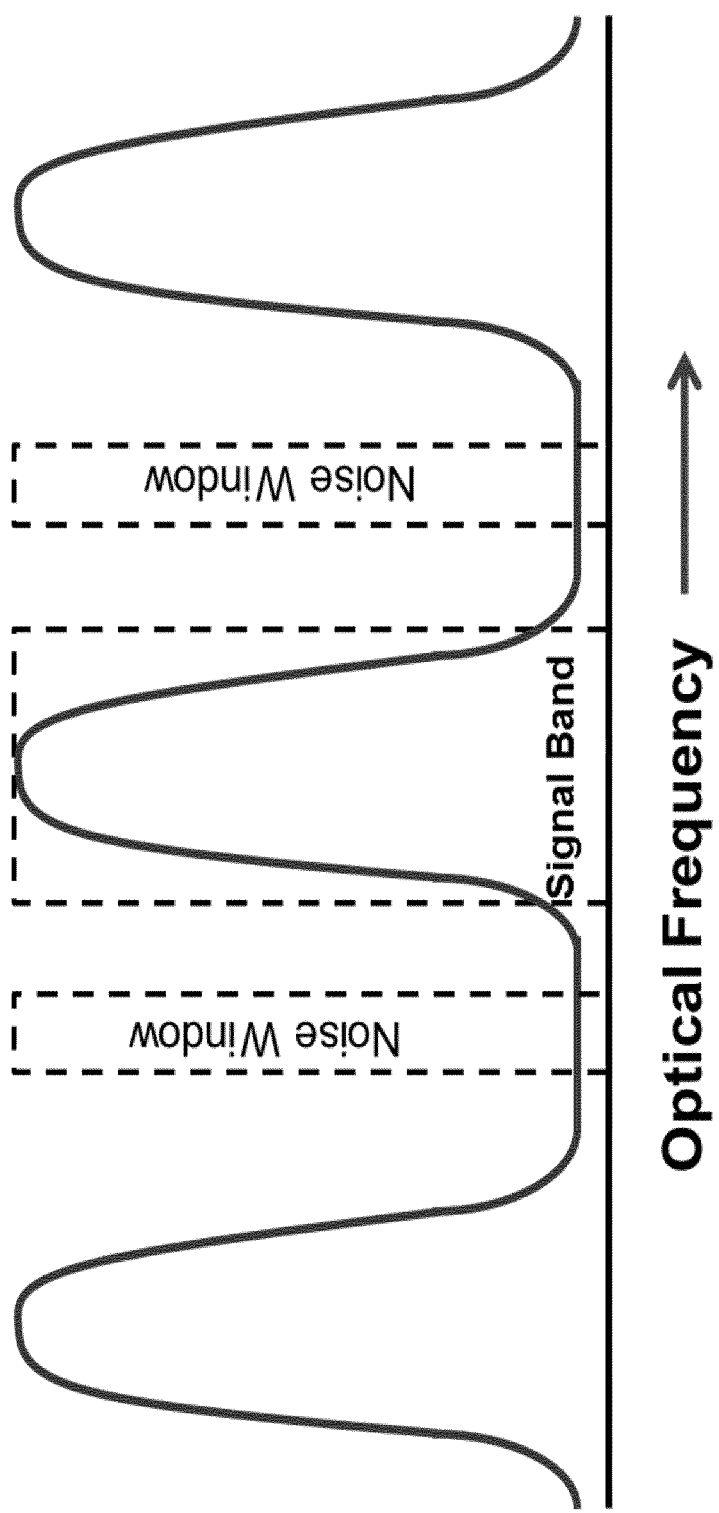
FIG. 2 shows a graphical depiction of the noise windows which are present between optical transmission channels.

OSNR value of an optical transmission system can be obtained using a measurement instrument such as an optical spectrum analyser (OSA), by measuring the total signal power in a channel passband compared with the inter-channel optical noise power between the optical channels (usually normalized to a 0.1 nm bandwidth) (see EC 61280-2-9 Fiber Optic Communication Subsystem Test Procedures Part 2-9: Digital Systems Optical Signal-to-Noise Ratio Measurement for Dense Wavelength-Division Multiplexed Systems). FIG. 2 shows a graphical depiction of the noise windows which are present between optical transmission channels.

This measurement technique generally utilises expensive specialist optical equipment and it gives a true OSNR value for an optical communications link which does not use optical filters such as the ROADM filters. In current optical networks, ROADMs (Reconfigurable Optical Add-Drop Multiplexers) are widely deployed as optical networking elements for adding and dropping wavelength channels from WDM networks. As optical signals pass through ROADMs in the network, ROADM filters suppress the inter-channel optical noise between the optical channels. The standard OSNR measurement method described above with reference to FIG. 2 does not give a true OSNR value for such an optical communications link with ROADMs since the noise level will be underestimated resulting in a misinterpretation of the OSNR value.

To solve the issue of OSNR measurement in ROADM based networks, in-band OSNR measurement methods and instruments were developed using an optical polarisation nulling technique (see W. Moench, J. Larikova, *"Measuring the Optical Signal-to-Noise Ratio in Agile Optical Networks"*, OFC/NFOEC 2007, paper NWC1). This technique is based on the assumption that an optical signal is highly polarised and optical noise is completely unpolarised so that the OSNR can be derived from the separately measured signal and noise power on different polarisations (J H Lee, et. al., *"A Review of the Polarization-Nulling Technique for Monitoring Optical-Signal-to-Noise Ratio in Dynamic WDM Networks"*, Journal of Lightwave Technology, November 2006, Vol. 24, No. 11, pp. 4162-4171). Therefore the in-band OSNR measurement works for networks where optical signals are highly polarised with single polarisation, such as 10 Gbit/s and 40 Gbit/s signals in grid-based networks (M. Feres, et. al., *"Optimisation algorithms for OSNR measurement based on polarisation nulling"*, Electronics Letters, 25 Jun. 2015, Vol. 51, No. 13, pp. 1007-1009). In gridless coherent optical systems, advanced modulation formats are the key to achieve high speed at 100 Gbit/s and beyond, where dual polarisations are always used, e.g. 100 Gbit/s DP-QPSK, and 200 Gbit/s DP-16QAM. Since optical signals no longer have well defined single polarisation, the in-band OSNR measurement method is no longer valid in coherent optical systems. Although with coherent technology performance monitoring on some system parameters, such as chromatic dispersion and PMD, are readily available from the optical transponders, the OSNR monitoring is still difficult and not available. So far it is still a difficult topic to measure or derive OSNR for coherent optical systems with ROADMs.

Figure 3:
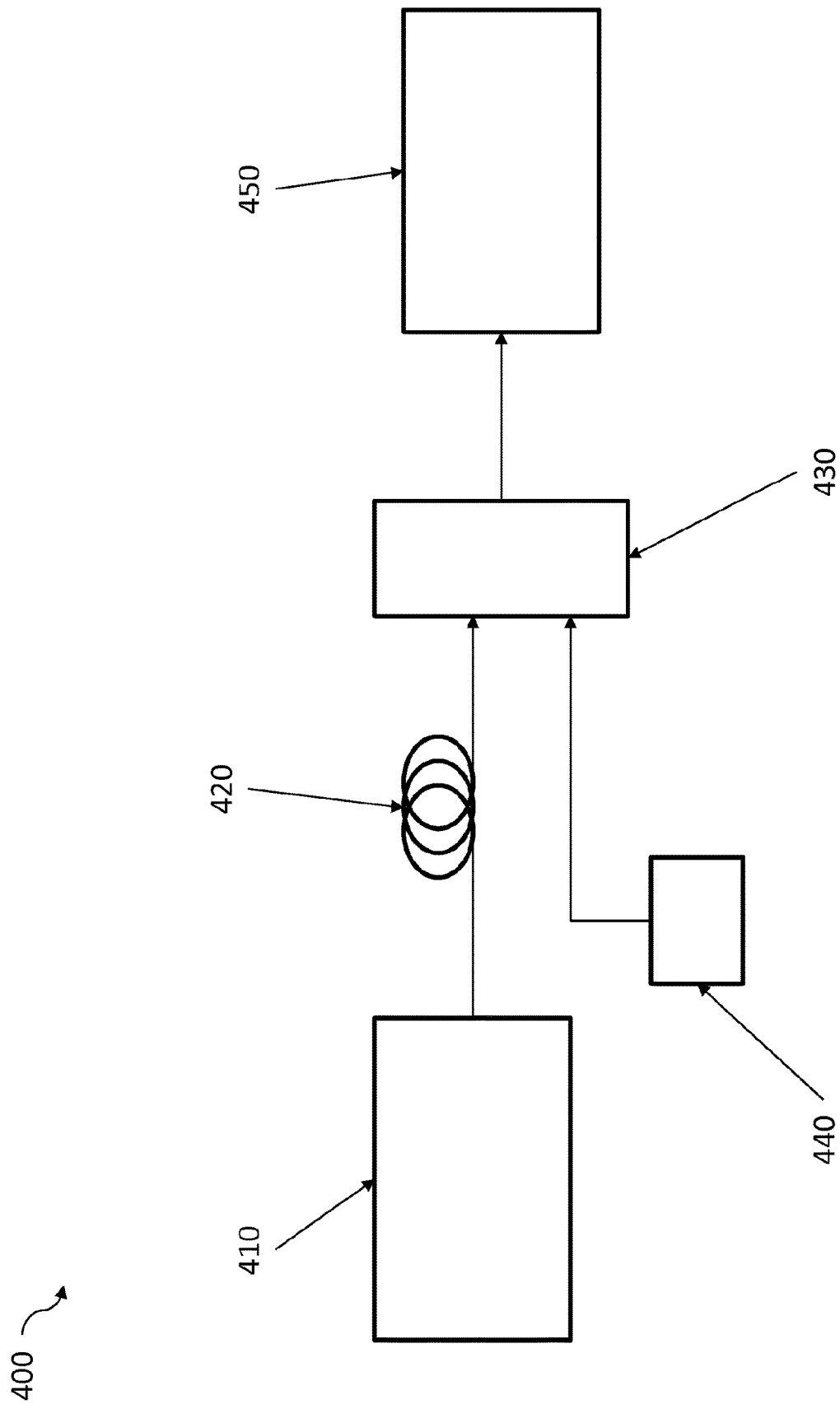
FIG. 3 shows a schematic depiction of a measurement apparatus 400 for an optical communications link.

FIG. 3 shows a schematic depiction of a measurement apparatus 400 for an optical communications link. An optical transmitter 410 launches a signal into a first end of an optical communications link 420 under measurement and the second end of optical communications link is connected to an input of an optical coupler 430. A source of optical noise 440 is also connected to a further input of the optical coupler 430 and the output of the optical coupler is connected to an optical receiver 450. The optical transmitter 410 and the optical receiver 450 are the complementary components of an optical transponder. The optical communications link is a typical optical communications link in that it may contain optical fibre amplifiers etc. but it must not comprise ROADMs or other components with similar optical filters. The optical communications link is preferably a length of fibre in a test or laboratory environment. A fibre in a network could be used but it will be understood that if the fibre is carrying live traffic then the addition of the optical noise is likely to lead to unacceptable losses.

Figure 4:
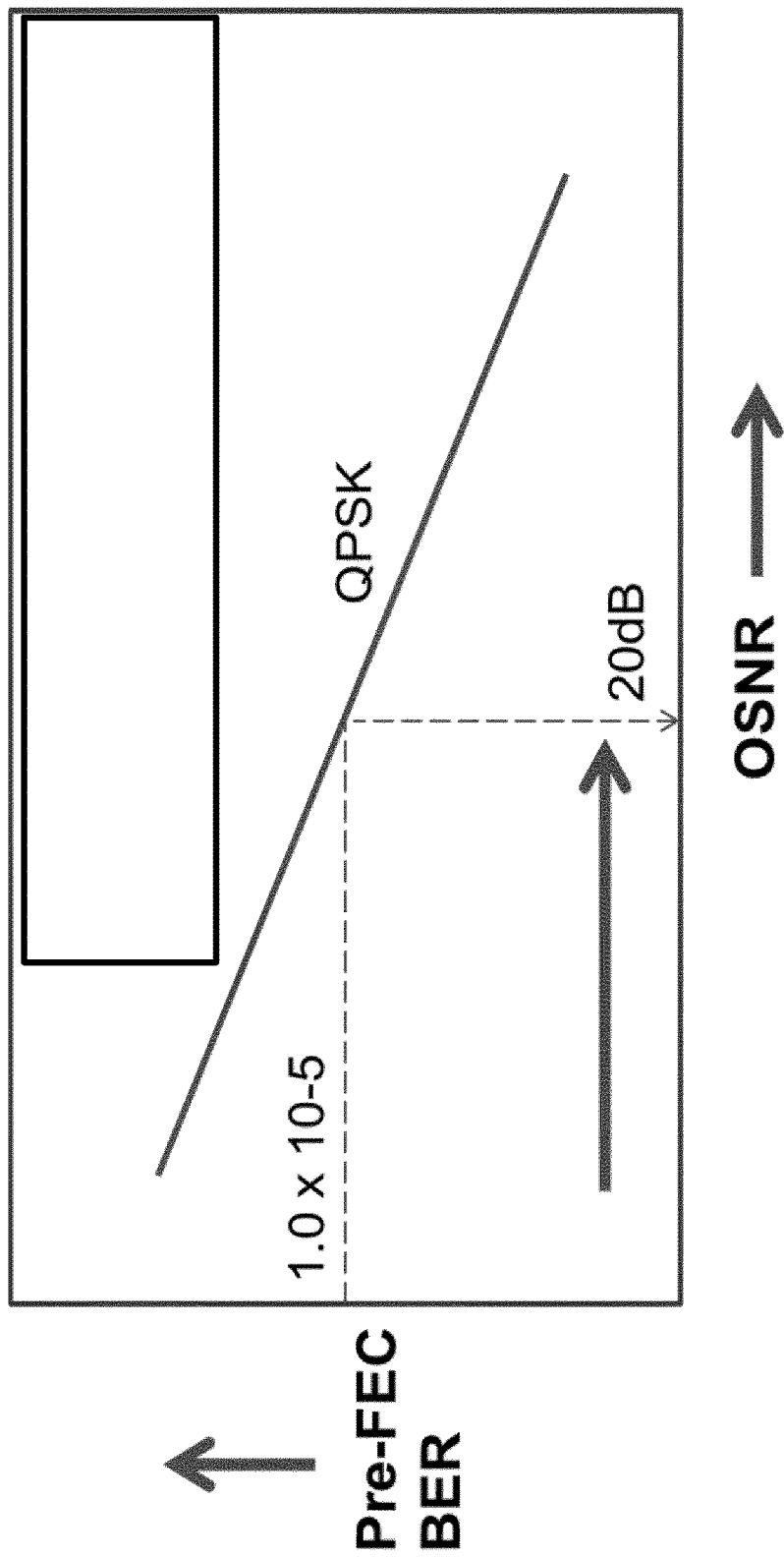
FIG. 4 shows a graphical depiction of the relationship between pre-FEC BER and OSNR.

The measurement apparatus 400 is used to generate a pre-FEC BER vs OSNR curve for the optical transponder under test (the optical transponder comprises the optical source 410 and the receiver 450). The output of the optical noise source 440 is controlled in order to generate a desired OSNR. The pre-FEC BER can then be measured for that particular OSNR. This process can be repeated for different OSNR values in order to generate a curve showing the relationship between pre-FEC BER and OSNR. FIG. 4 shows a graphical depiction of such a relationship.

Figure 5:
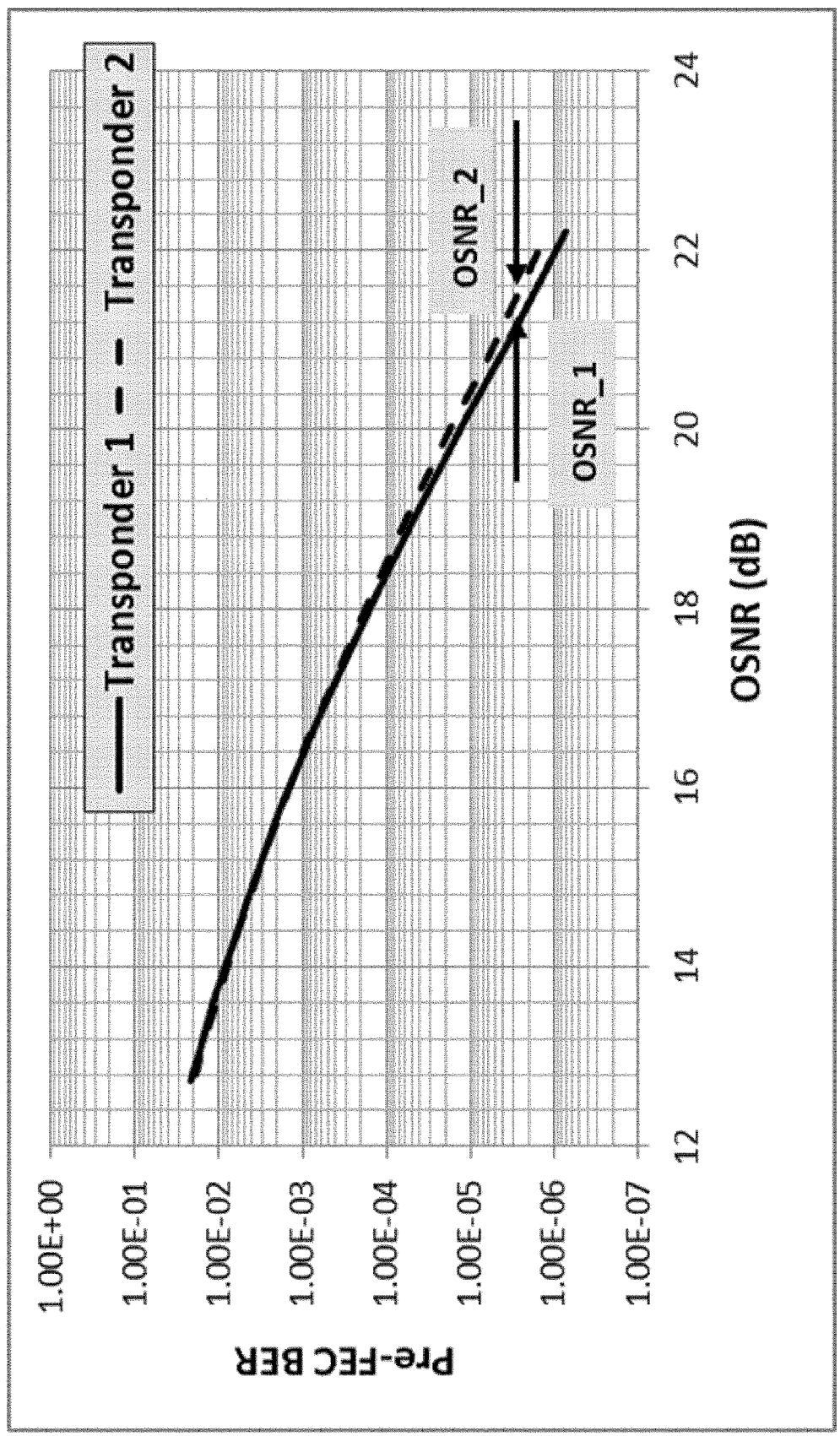
FIG. 5 shows a schematic depiction of the measured performance of pre-FEC BER vs OSNR curves for two different transponders using the same settings.

The pre-FEC BER vs OSNR will be different for different transponder technologies, i.e. modulation format, baud rate and speed, as well as for different vendor implementations. For a given vendor transponder technology, commercial transponders have consistent and reliable optical performance characteristics, however small performance variations are inevitable. Therefore in producing the pre-FEC BER vs OSNR curve, it is important to take this into consideration and minimise the impact from transponder variations. FIG. 5 shows a graphical depiction of the measured performance of pre-FEC BER vs OSNR curves for two different transponders of the same model from the same manufacturer using the same settings (namely 100 Gbit/s, DP-QSK modulation). It can be seen that these transponders display consistent and reliable optical performance with only a small difference between them. For example, at a BER of 3×10⁻⁶, the corresponding OSNR values, OSNR_1 and OSNR_2, for the two curves have a difference of 0.4 dB.

To improve the accuracy of OSNR derivation, an averaged pre-FEC BER vs OSNR curve can be used. In such a case, the averaged OSNR value is an average derived from the OSNR values of a number of different curves. In the case where 2 curves are measured;

$$OSNR\_avg = \frac{(OSNR\_1 + OSNR\_2)}{2} \quad [1]$$

Figure 6:
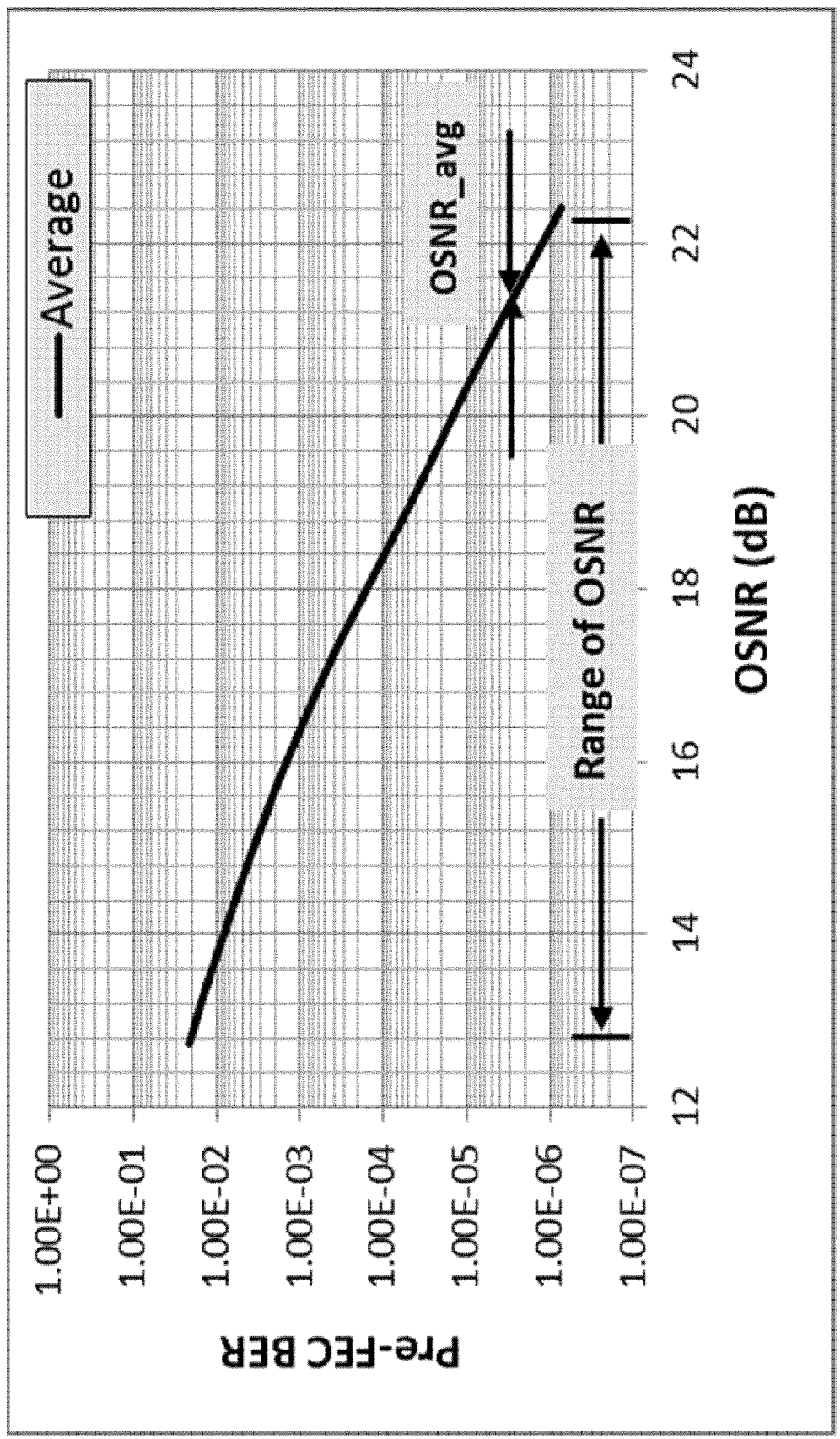
FIG. 6 shows a schematic depiction of a pre-FEC BER vs OSNR characteristic.

In general, in order to minimise the impact from the variations among different transponders of the same type, a number of transponders, e.g. N transponders, should be used for the pre-measurement and calibration step, and then the average pre-FEC BER vs OSNR curve is derived from the individual N pre-FEC BER vs OSNR curves for the network operation analysis as follows:

$$OSNR\_avg = \frac{1}{N}\sum_{i=1}^{N} OSNR\_i \quad [2]$$

where OSNR_i is the OSNR value for a given pre-FEC BER value on individual pre-FEC BER vs OSNR curves. FIG. 6 shows a schematic depiction of a pre-FEC BER vs OSNR characteristic, where for a given pre-FEC BER value, the corresponding average OSNR value is an average of the OSNR values from two individual characteristics.

The accuracy of the averaged pre-FEC BER vs OSNR curve can be estimated based on the measured curves:

$$OSNR\_var = \frac{1}{N}\sum_{i=1}^{N}(OSNR\_i)^2 - (OSNR\_avg)^2 \quad [3]$$

$$OSNR\_accuracy\ (\%) = \frac{OSNR\_var}{OSNR\_avg} \times 100 \quad [4]$$

The choice of N is a trade-off between the accuracy of OSNR estimate and the amount of pre-measurements required to determine the relationship between pre-FEC BER and OSNR. It should be understood that a pre-FEC BER-OSNR curve will need to be derived for each type of optical transponder from each equipment supplier.

Figure 7:
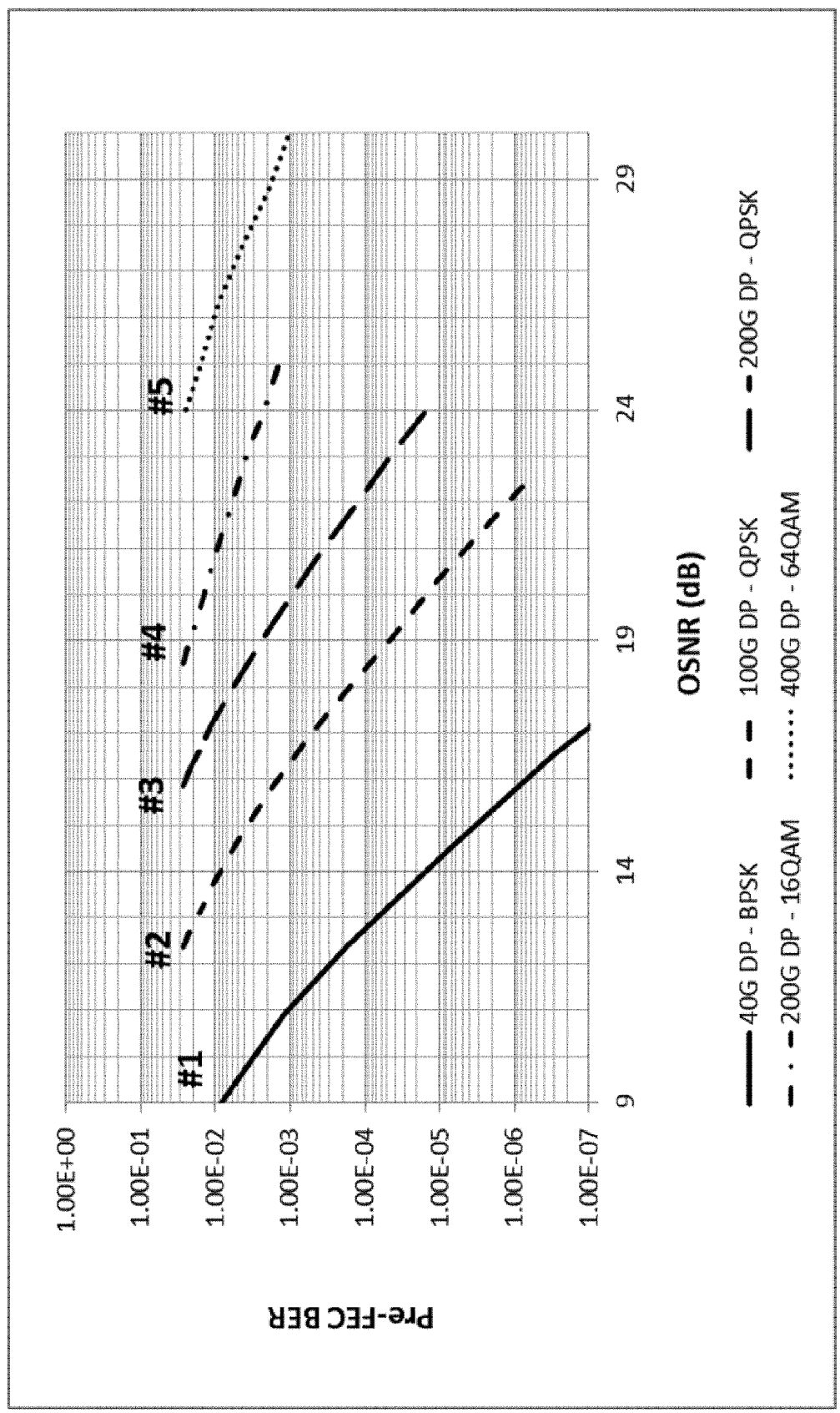
FIG. 7 shows a graphical depiction of the pre-FEC BER vs OSNR curves for the five different modulation formats.

The method may further comprise the use of re-configurable transponders which can support multiple modulation formats, for example, QPSK, 16QAM, 8QAM, 64QAM etc. Assuming a given reconfigurable transponder technology with 5 different modulation formats, such as 40G DP-BPSK, 100G DP-QPSK, 200G DP-QPSK, 200G DP-16QAM, 400G DP-64QAM, FIG. 7 shows a graphical depiction of the pre-FEC BER vs OSNR curves for the five different modulation formats for a particular transponder. Due to the reach vs rate performance of the different modulation formats (see G Bosco, et. al., "On the Performance of Nyquist-WDM Terabit Superchannels Based on PM-BPSK, PM-QPSK, PM-8QAM or PM-16QAM Subcarriers", Journal of Lightwave Technology, Vol. 29, No. 1, 2011, pp. 53-61), these 5 modulation formats cover different OSNR ranges and thereby extend the applicability and accuracy of the OSNR derivation. For example, 400G DP-64QAM requires a higher link OSNR than other modulation formats to achieve a comparable error rate, whereas 40G DP-BPSK requires a much lower OSNR to operate at a given error rate. Table 3 below illustrates examples of different modulation formats and their indicative range of OSNR which can be used. For some OSNR values, only one modulation format is applicable, for example between 9-12.5 dB and between 25-30 dB.

However, if the OSNR is 20 dB then this is within the OSNR range of three different modulation formats which could then be used when determining the OSNR based on a measured bit error rate. As also shown in Table 3, we can clearly see that using multiple modulation formats and baud rates enhances the range over which the optical signal to noise ratio can be derived. It should be noted that this method is equally applicable to using the pre-FEC BER data taken from different separate transponders all operating on the same link, which may operate with different modulation format and baud rates.

TABLE 3

Examples of various modulation formats and the applicable range for OSNR derivation

| Modulation format | Range of OSNR (dB) | Applicable curve (FIG. 7) | Expected accuracy (dB) |
| --- | --- | --- | --- |
| 40 G DP-BPSK | 9-17 | #1 | within ± 0.5 |
| 100 G DP-QPSK | 12.5-22 | #2 | within ± 0.5 |
| 200 G DP-QPSK | 16-24 | #3 | within ± 0.5 |
| 200 G DP-16QAM | 19-25 | #4 | within ± 0.5 |
| 400 G DP-64QAM | 24-30 | #5 | within ± 0.5 |

Figure 8:
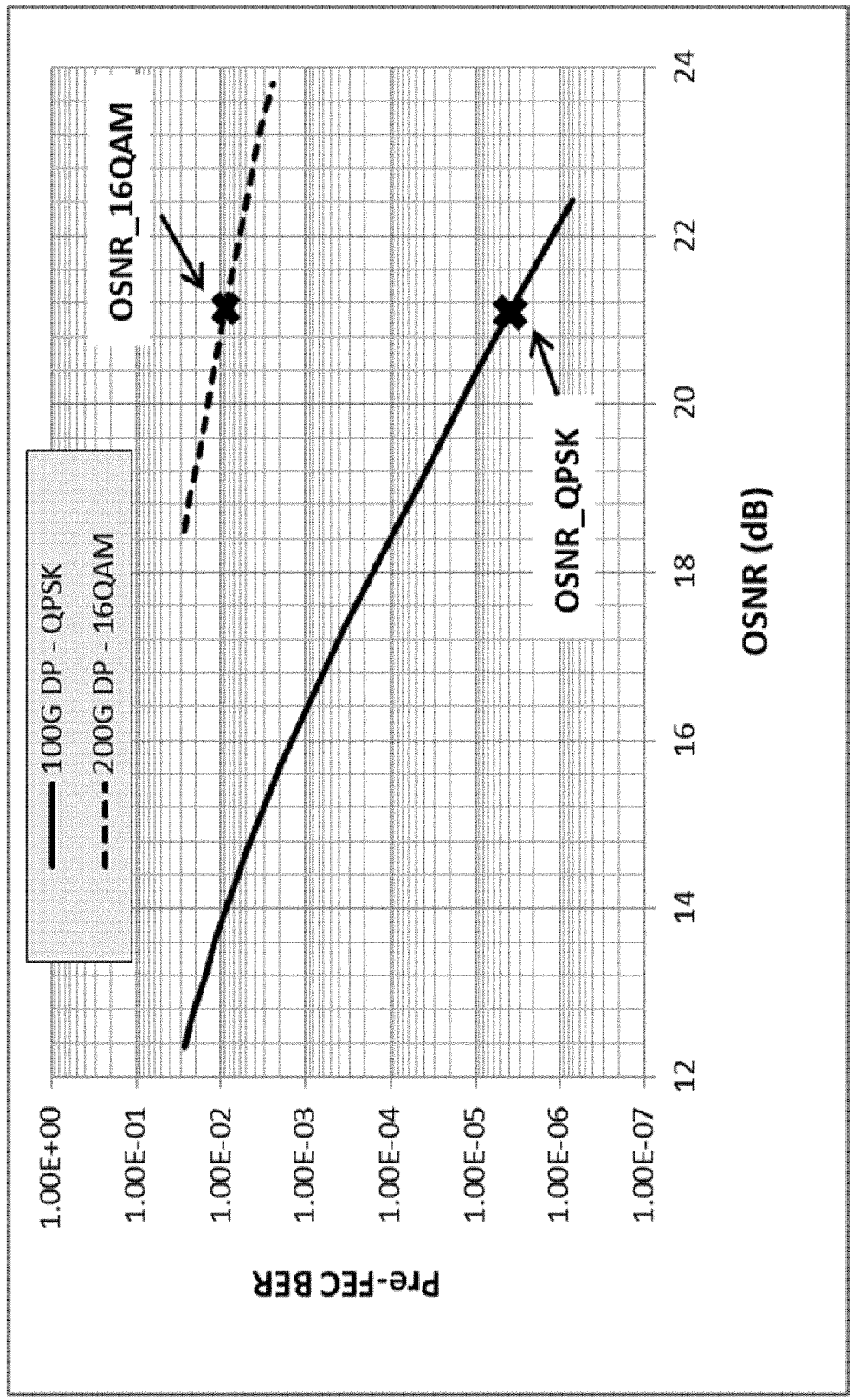
FIG. 8 shows a graphical depiction of how two different modulation formats can be used to further refine the OSNR derivation.

FIG. 8 shows a graphical depiction of how two different modulation formats can be used to further refine the OSNR derivation using two different modulation formats. The optical transponder can be configured to use two different modulation formats, for example 100 Gbit/s DP-QPSK and 200 Gbit/s DP-16QAM, where pre-FEC BER and OSNR curves for both these modulation formats have already been generated. The concept can be extended to use multiple modulation formats and pre-FEC OSNR curves, thereby improving accuracy of the OSNR derivation.

Given an optical path, first a 100 Gbit/s DP-QPSK optical signal is transmitted over the optical path, a pre-FEC BER of 3.66×10⁻⁶ is obtained for the optical channel. Using the pre-FEC BER vs OSNR curve, this gives an estimated OSNR of 21.148 dB. Then re-configure the optical channel to 200 Gbit/s DP-16QAM, a pre-FEC BER of 9.4×10⁻³ is measured for the optical channel performance. Using the curve for 200 Gbit/s DP-16QAM in FIG. 8, this gives an OSNR of 20.96 dB. These estimated OSNR values agree well. To further improve the accuracy of the OSNR estimate, an average value, i.e.

$$OSNR = \frac{(OSNR\_16QAM + OSNR\_QPSK)}{2}$$

of the two estimates could be used, which in this case gives an OSNR of 21.05 dB.

Figure 9:
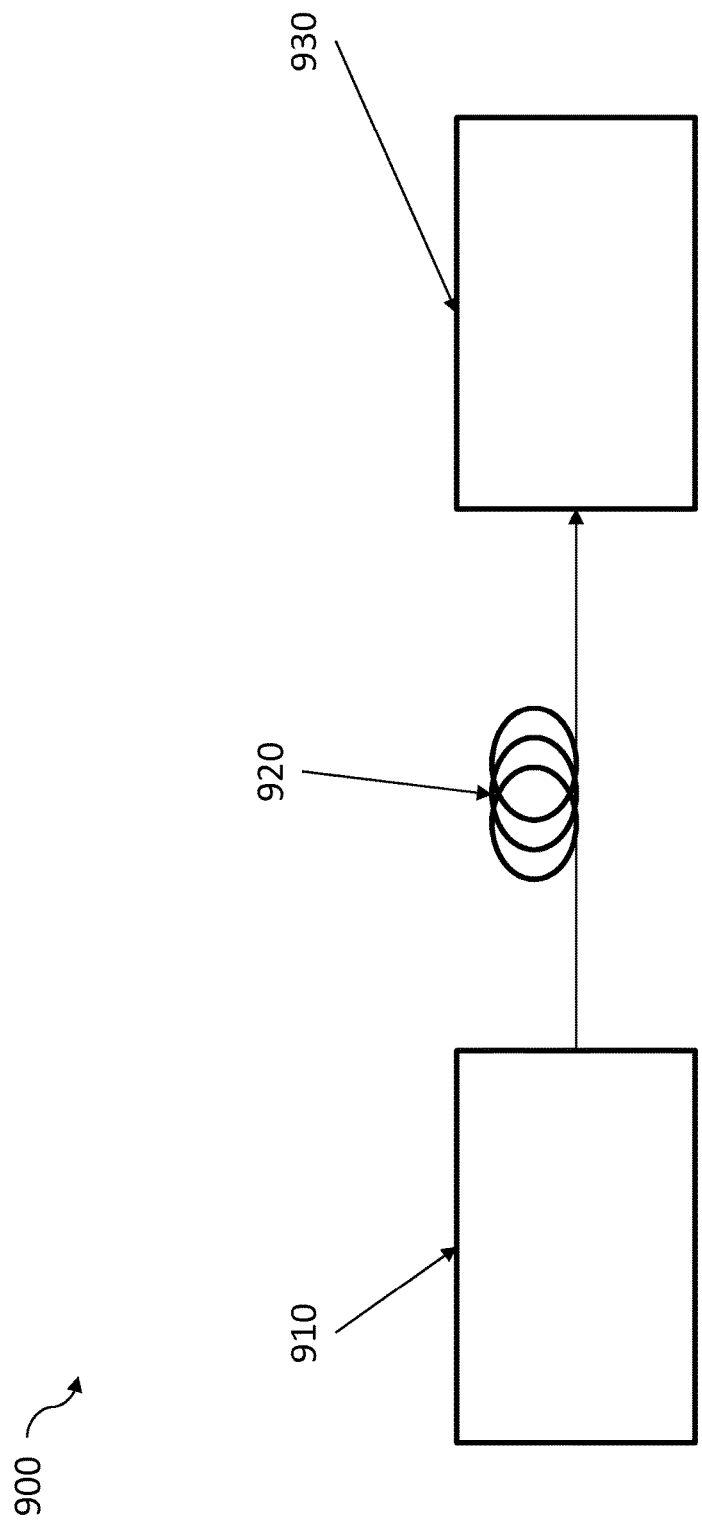
FIG. 9 shows a schematic depiction of a deployed optical communications network.

FIG. 9 shows a schematic depiction of a deployed optical communications network, which comprises an optical transponder comprising an optical transmitter 910 and an optical receiver 930 which are connected via an optical communications link 920. In contrast to the optical communications link 320 described above with reference to FIG. 3, optical communications link 920 is likely to comprise ROADMs, and other optical components which will comprise optical filters, such that it is not possible to measure the OSNR of optical communications link 920 using conventional techniques. It will be understood that the optical transmitter 910 and the optical receiver 930 are likely to be located in different cities.

The performance of the optical communications link 920 can be determined by powering on the transponder using its default settings. Typically these settings are those which are most likely to ensure the operation of the link, for example BPSK at 25 Gbaud or QPSK at 25 Gbaud (see Table 1 above). The pre-FEC BER is determined directly by the transponder when the link is in operation and thus it is possible to measure the pre-FEC BER for that modulation format. The transponder can then be re-configured to use a further modulation format and the pre-FEC BER can be determined for that modulation format. This process is repeated for all of the transponder modulation formats that will work over the optical communications link 920. The result will be one or more pre-FEC BERs and these pre-FEC BER values can be used with the respective pre-FEC BER-OSNR characteristic to determine the OSNR value for the optical communications link. If a plurality of OSNR values are determined then an average OSNR value may be determined with higher accuracy If the OSNR is determined as being, for example, 19 dB then it can be seen from Table 1 that three different modulation formats would be suitable for use over the optical communications link. These options can be displayed, for example via a network management system along with, for example details of the pre-FEC BER measurements, OSNR values and expected margins. The transponder can then be configured to select a modulation format to use in accordance with one or more preferences.

Figure 10:
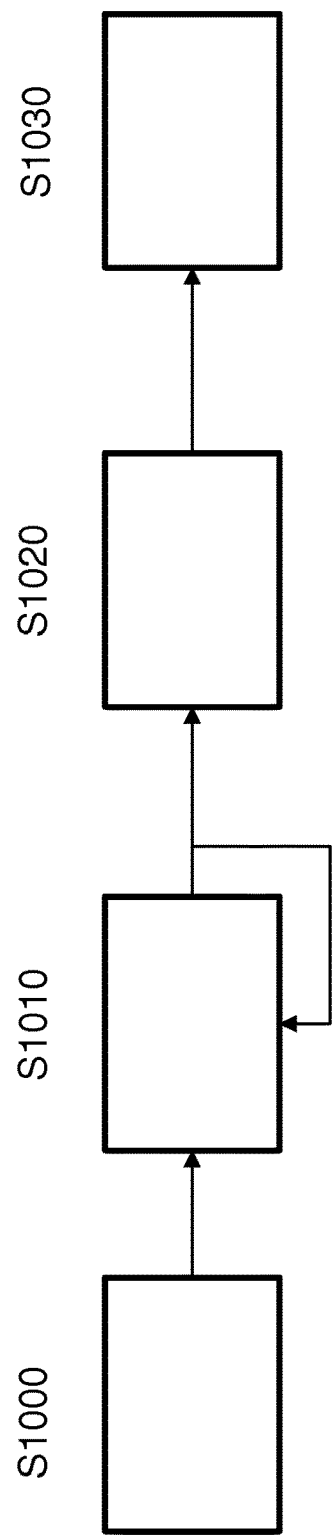
FIG. 10 shows a diagrammatic representation of the process of configuring an optical transponder.

A modulation format may be selected in order to optimise the use of the capacity of the optical communications link. Referring to FIG. 10, at step S1000 the pre-FEC BER is measured for the modulation format having the highest OSNR margin (i.e. the modulation format that is most likely to work over the link). At step S1010 the modulation format with the next highest margin is selected and the pre-FEC BER is measured. Step S1010 is repeated until a modulation format is found which does not work over the optical link. At step S1020 the OSNR is determined on the basis of the one or more pre-FEC BERs measured in S1010 and the pre-determined pre-FEC BER-OSNR characteristic. At step 1030 the transponder selects the modulation format with the lowest margin that is within the desired operational margin limits and computes the number of sub channels which will be required to provide the desired superchannel capacity. Generally, the preferred configuration will be the superchannel configuration which has the highest spectral efficiency, that is which uses the minimum bandwidth to deliver the desired capacity.

It will be understood that the determination of the OSNR, via one or more pre-FEC BER measurements, the selection of a modulation format and then the computation of the superchannel configuration may be performed automatically by the optical transponder (optical transmitter 910 & optical receiver 930) when it is connected to an optical transmission link and is powered on. However, in practice it is preferable that the modulation format and superchannel information are calculated and are then presented to the team installing the transponder who can confirm and commit the final configuration of the transponder format and link operational parameters.

Figure 11:
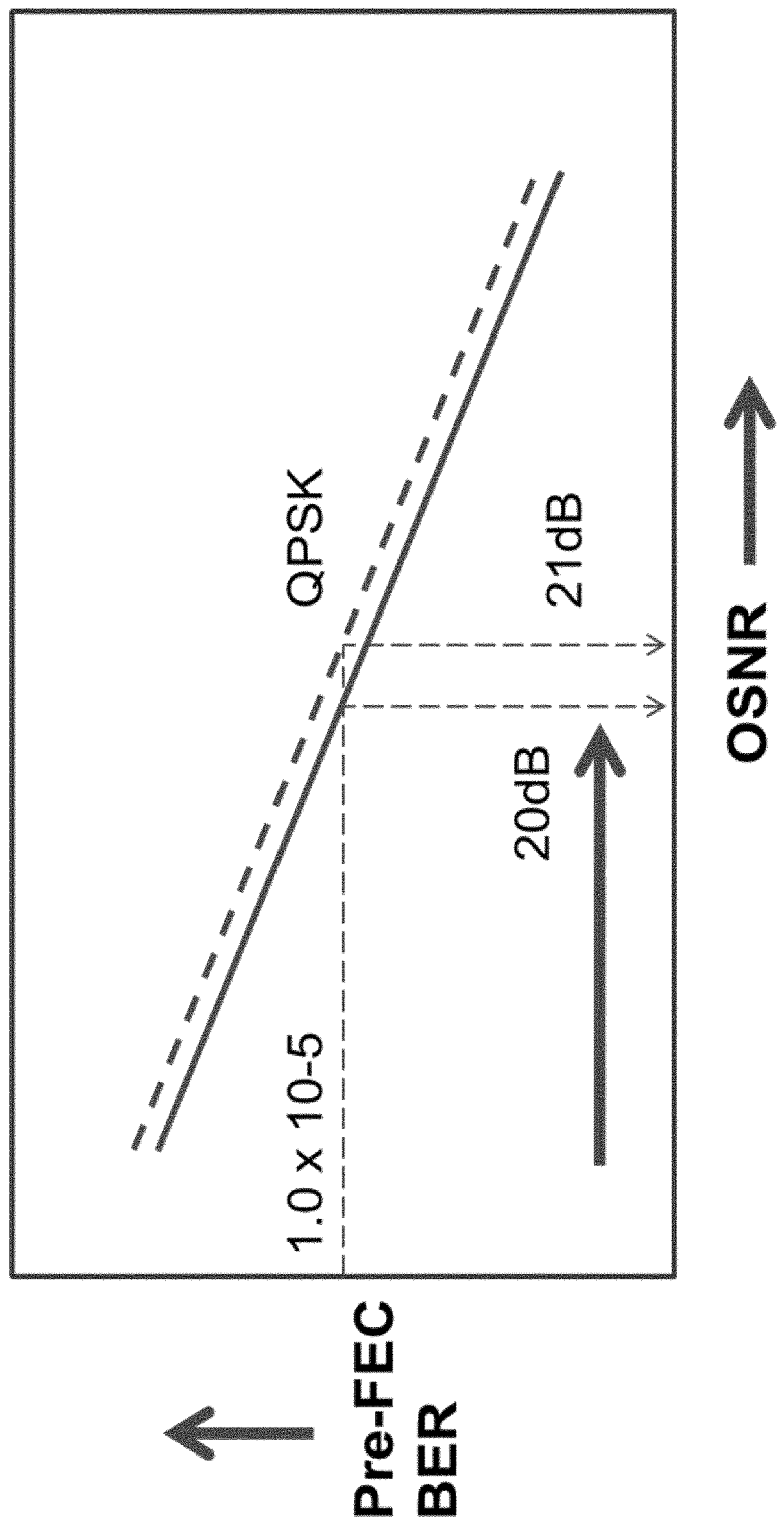
FIG. 11 shows a graphical representation of the variation of the OSNR for a link with time.

As discussed in earlier sections, the Operational margin ($O_{OSNR}$) is expected to include such effects as transponder aging and degradation of the optical link. Transponder characteristics that degrade over time and erode the pre-FEC BER vs. OSNR curve can be estimated with some degree of confidence, in particular, over the number of years that an optical fibre system might be in operation (which may be greater than 10 years). We can therefore expect that the degradation of the pre-FEC BER vs. OSNR curve can be represented as shown with the dashed curve in FIG. 11, where a revised curve, with a ~1 dB erosion of the optical performance during the life of the system is shown (~0.1 dB/year). We can therefore very conveniently use the same methodology to continue to derive a reliable OSNR measurement and derive the OSNR of the optical link during the lifetime of the optical system.

The method has been used in field trials using a 359 km optical fibre link which comprises 6 spans of standard G.652 optical fibre. The transponders used were 64 GBaud flexible rate transponders capable of operating using 100G DP-QPSK, 200G DP-16QAM or 200G DP-QPSK modulation formats. The pre-FEC BER vs. OSNR curve was determined for a number of transponders for each of the available modulation formats. Table 4 below shows the data obtained for the 200G DP-QPSK modulation format.

TABLE 4 pre-FEC BER vs. OSNR data from field trial

| Pre-FEC BER | Average OSNR (dB) | Standard Deviation (dB) | Accuracy (%) |
|---|---|---|---|
| $1 \times 10^{-2}$ | 15.91 | 0.12 | 0.74 |
| $4 \times 10^{-3}$ | 17.46 | 0.18 | 1.05 |
| $1 \times 10^{-3}$ | 19.49 | 0.26 | 1.35 |
| $4 \times 10^{-4}$ | 20.74 | 0.34 | 1.62 |
| $1 \times 10^{-4}$ | 22.64 | 0.52 | 2.32 |
| $4 \times 10^{-5}$ | 24.05 | 0.7 | 2.9 |
| $1 \times 10^{-5}$ | 25.88 | 0.59 | 2.26 |

Figure 12:
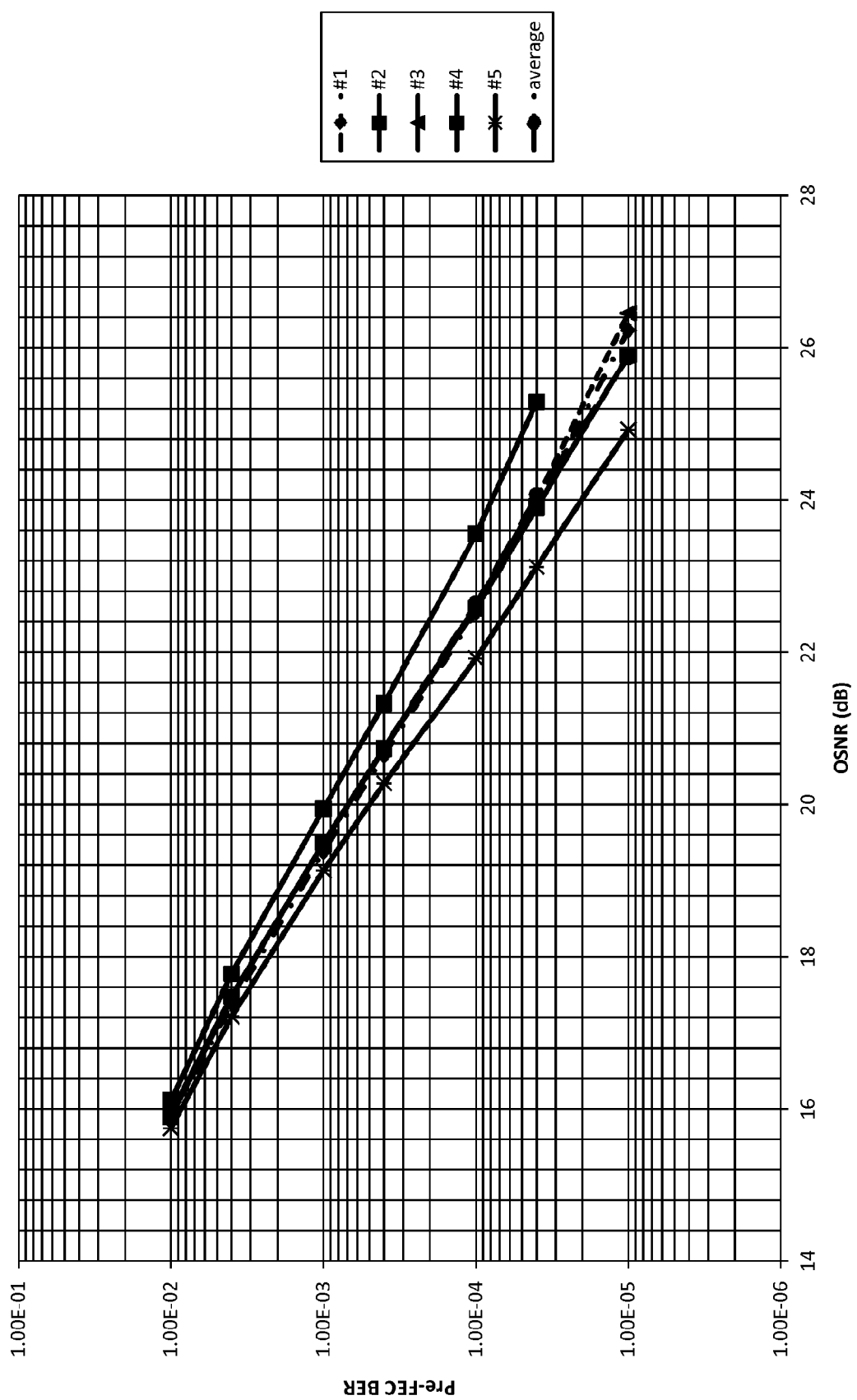
FIG. 12 shows a graphical depiction of the pre-FEC BER vs. OSNR characteristic for each of the transponders operating at 200G DP-QPSK.

The pre-FEC BER vs. OSNR characteristic for each of the transponders operating at 200G DP-QPSK, as well as the curve showing the average-FEC BER vs. OSNR values are shown graphically in FIG. 12. It can be seen that the accuracy of the measurements is better at lower OSNR values.

Figure 13A:
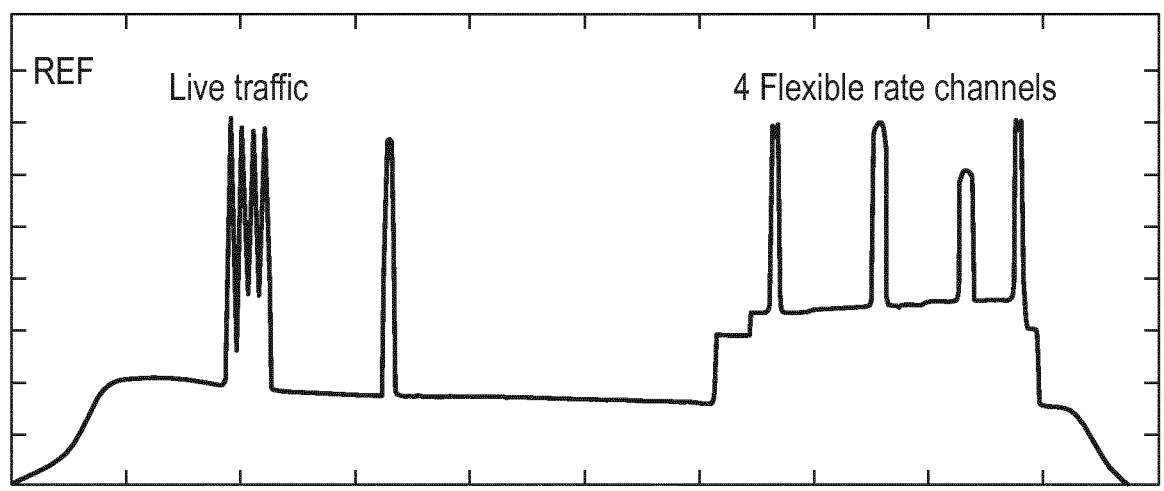
FIG. 13*a* shows a graphical depiction of the optical spectra carried across a live fibre link.
Figure 13B:
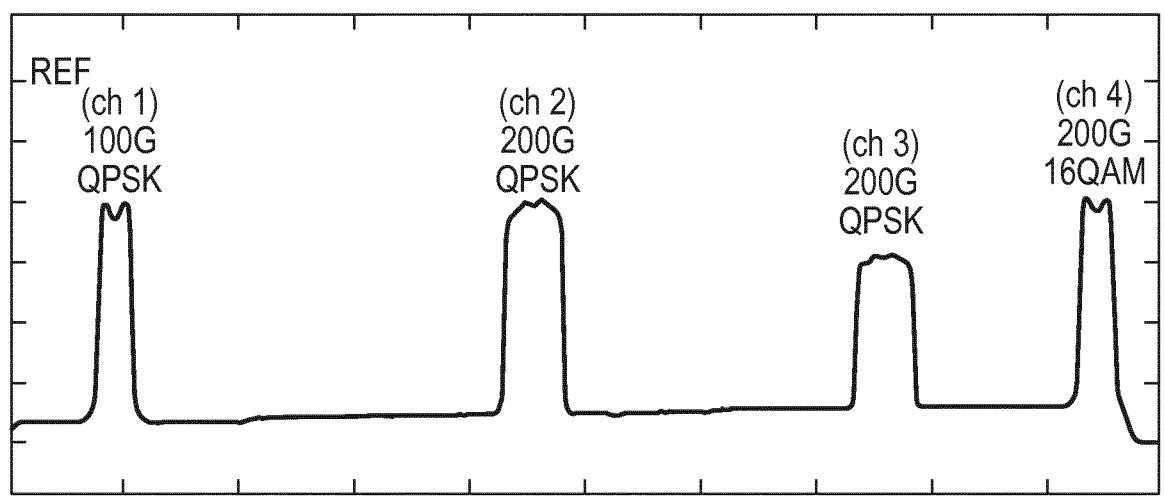
FIG. 13B shows a more detailed depiction of the spectra of the 4 flexible rate optical channels.

Now that the pre-FEC BER vs. OSNR characteristics had been derived for those transponders, the pre-FEC BER vs. OSNR characteristics were used to derive the OSNR for a live optical link. The link connects Dublin to London and comprises 10 spans of standard G.652 optical fibre. The link is 727 km long and includes a 133 km submarine section, 4 ROADM nodes and 2 intermediate exchanges. The link carries a number of line 40 Gbit/s and 100 Gbit/s DWDM channels as well as 4 flexible rate optical channels. FIG. 13*a* shows a graphical depiction of the optical spectrum carried across the link and FIG. 13*b* shows a more detailed depiction of the spectra of the 4 flexible rate optical channels. The 4 flexible rate optical channels are each configurable such that they can operate using different modulation formats and transmit at different power levels.

Table 5 below shows the OSNR measurements for the 4 individual channels using the 3 different modulation formats operating at normal transmission power (note: the 200G QPSK channel has ~3 dB higher channel power than the 200G 16QAM and 100G QPSK channels due to the wider spectral width [~75 GHz] associated with that channel). The derived OSNR is compared to the OSNR values obtained from conventional 'on/off' measurement.

TABLE 2

Comparison of OSNR values

| Channel | 100 G QPSK OSNR (dB) | | 200 G 16QAM OSNR (dB) | | 200 QPSK OSNR (dB) | |
|---|---|---|---|---|---|---|
| | Conventional measurement | Derived measurement | Conventional measurement | Derived measurement | Conventional measurement | Derived measurement |
| 1 | 15.76 | 15.27 | 20.71 | 20.54 | 18.63 | 17.95 |
| 2 | 17.03 | 16.35 | 20.07 | 19.71 | 19.69 | 19.22 |
| 3 | 17.03 | 16.75 | 20.68 | 20.07 | 20.00 | 19.79 |
| 4 | 17.77 | 17.26 | 20.30 | 19.47 | 20.11 | 19.89 |

Table 5 shows clearly that the derived OSNR values agree well with the values obtained from conventional measurement techniques, that is to less than 1 dB. Thus, it can be seen that the method according to present invention provides accurate and reliable derived OSNR values. To further understand the potential operating power range for this technique, we investigated the impact of optical signal power on the derived OSNR values using this new technique.

Figure 14:
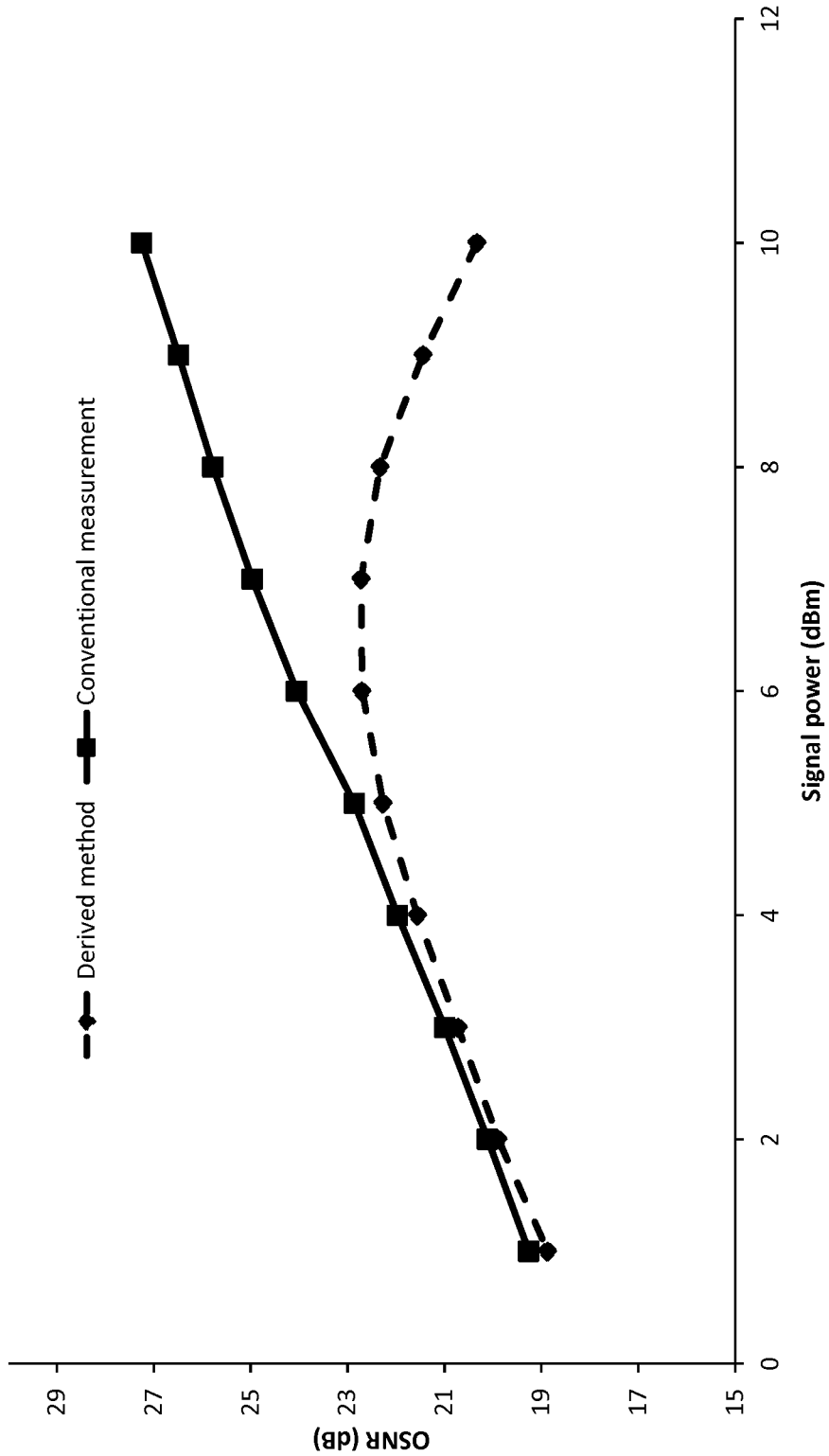
FIG. 14 shows a graphical depiction of the derived OSNR at different signal power levels

FIG. 14 shows a graphical depiction of the derived OSNR (using 200G DP-QPSK) at different signal power levels, compared with the conventional 'on/off' measurement. As can be seen, the derived OSNR values agree to within <1 dB for signal power up to 5 dBm. Beyond 5 dBm, the OSNR difference increases markedly due to the performance penalty caused by fibre nonlinearity. Similar trends were observed for 100G DP-QPSK and 200G DP-16QAM It will be understood that the method of the present invention may be implemented by executing additional computer code within optical transponders. It should be understood that the structure and function of the optical transponders is not critical as long as it is capable of being modified in order to perform a method according to the present invention. Such computer code may be deployed via download, for example via the internet, or on some physical media, for example, USB memory stick, memory card, etc.

In summary, the present invention provides a method of indirectly determining the optical signal-noise ratio of an optical fibre communications link. In a test environment, the relationship between OSNR and pre-FEC BER (forward error-corrected bit error rate) is determined for a particular type of optical transponder. When a transponder of that type is connected to an optical communications link then the pre-FEC BER can be measured and the OSNR inferred from the pre-determined OSNR-BER relationship. The OSNR value can then be used to select a transponder modulation format or other transmission parameters.

The invention claimed is:

1. A method of determining the performance of an optical communications link, the method comprising the steps of:
   i) determining an OSNR (optical signal to noise ratio) to BER (bit error rate) relationship for an optical transponder, wherein the OSNR-BER relationship is determined from a plurality of OSNR-BER relationships each of which has been determined for one of a plurality of transponder modulation formats;
   ii) connecting the optical transponder to an optical communications link;
   iii) measuring the bit error rate of the optical communications link; and
   iv) determining the OSNR for the optical communications link in accordance with the relationship determined in step i) and the measurement made in step iii).

2. A method according to claim 1, wherein the BER is a pre-forward error correction (FEC) bit error rate.

3. A method according to claim 1, wherein the OSNR-BER relationship is determined from a plurality of OSNR-BER relationships each of which has been determined for one of a plurality of transponder data rates.

4. A method according to claim 1, wherein the bit error rate of the optical communications link is the average of a plurality of bit error rate measurements, wherein each of the plurality of bit error rates was measured with a different modulation format.

5. A method according to claim 1, wherein the OSNR-BER relationship is determined from a plurality of OSNR-BER relationships each of which has been determined for one of a plurality of optical transponders of the same type.

6. A method according to claim 1 wherein the method comprises the additional step of v) selecting a modulation format for use by the optical transponder in accordance with the OSNR determined for the optical communications link in step iv).

7. A method according to claim 6, wherein the method comprises the further step of vi) selecting one or more transmission parameters in accordance with the OSNR determined for the optical communications link in step iv).

8. A method according to claim 7, wherein the transmission parameter selected is the baud rate.

9. A method according to claim 1 in which the OSNR-BER relationship is determined using an optical fibre in a test environment and the optical communications link for which the OSNR is determined forms part of a live communications network.

10. An apparatus comprising an optical transmitter and an optical receiver, which when connected via an optical communications link are configured to perform the method of claim 1.

11. A non-transitory data carrier device comprising computer executable code for performing a method according to claim 1.

12. A method of determining the performance of an optical communications link, the method comprising the steps of:
   i) determining an OSNR (optical signal to noise ratio) to BER (bit error rate) relationship for an optical transponder, wherein the BER is a pre-forward error correction (FEC) bit error rate and the OSNR-BER relationship is determined from a plurality of OSNR-BER relationships each of which has been determined for one of a plurality of transponder data rates;

ii) connecting the optical transponder to an optical communications link;
iii) measuring the bit error rate of the optical communications link; and
iv) determining the OSNR for the optical communications link in accordance with the relationship determined in step i) and the measurement made in step iii).

13. A method according to claim 12, wherein the bit error rate of the optical communications link is the average of a plurality of bit error rate measurements, wherein each of the plurality of bit error rates was measured with a different modulation format.

14. A method according to claim 12, wherein the OSNR-BER relationship is determined from a plurality of OSNR-BER relationships each of which has been determined for one of a plurality of optical transponders of the same type.

15. A method according to claim 12 wherein the method comprises the additional step of v) selecting a modulation format for use by the optical transponder in accordance with the OSNR determined for the optical communications link in step iv).

16. A method according to claim 15, wherein the method comprises the further step of vi) selecting one or more transmission parameters in accordance with the OSNR determined for the optical communications link in step iv).

17. A method according to claim 16, wherein the transmission parameter selected is the baud rate.

18. A method according to claim 12 in which the OSNR-BER relationship is determined using an optical fibre in a test environment and the optical communications link for which the OSNR is determined forms part of a live communications network.

19. An apparatus comprising an optical transmitter and an optical receiver, which when connected via an optical communications link are configured to perform the method of claim 12.

20. A non-transitory data carrier device comprising computer executable code for performing a method according to claim 12.

21. A method of determining the performance of an optical communications link, the method comprising the steps of:
   i) determining an OSNR (optical signal to noise ratio) to BER (bit error rate) relationship for an optical transponder;
   ii) connecting the optical transponder to an optical communications link;
   iii) measuring the bit error rate of the optical communications link;
   iv) determining the OSNR for the optical communications link in accordance with the relationship determined in step i) and the measurement made in step iii); and
   v) selecting a modulation format for use by the optical transponder in accordance with the OSNR determined for the optical communication link in step iv).

22. An apparatus comprising an optical transmitter and an optical receiver, which when connected via an optical communications link are configured to perform the method of claim 21.

23. A non-transitory data carrier device comprising computer executable code for performing a method according to claim 21.

24. A method of determining the performance of an optical communications link, the method comprising the steps of:
   i) determining an OSNR (optical signal to noise ratio) to BER (bit error rate) relationship for an optical transponder;
   ii) connecting the optical transponder to an optical communications link;
   iii) measuring the bit error rate of the optical communications link; and
   iv) determining the OSNR for the optical communications link in accordance with the relationship determined in step i) and the measurement made in step iii);
   wherein the bit error rate of the optical communications link is the average of a plurality of bit error rate measurements, and wherein each of the plurality of bit error rates was measured with a different modulation format.

25. A method of determining the performance of an optical communications link, the method comprising the steps of:
   i) determining an OSNR (optical signal to noise ratio) to BER (bit error rate) relationship for an optical transponder;
   ii) connecting the optical transponder to an optical communications link;
   iii) measuring the bit error rate of the optical communications link; and
   iv) determining the OSNR for the optical communications link in accordance with the relationship determined in step i) and the measurement made in step iii);
   wherein the OSNR-BER relationship is determined from a plurality of OSNR-BER relationships each of which has been determined for one of a plurality of optical transponders of the same type.

26. A method of determining the performance of an optical communications link, the method comprising the steps of:
   i) determining an OSNR (optical signal to noise ratio) to BER (bit error rate) relationship for an optical transponder;
   ii) connecting the optical transponder to an optical communications link;
   iii) measuring the bit error rate of the optical communications link; and
   iv) determining the OSNR for the optical communications link in accordance with the relationship determined in step i) and the measurement made in step iii);
   in which the OSNR-BER relationship is determined using an optical fibre in a test environment and the optical communications link for which the OSNR is determined forms part of a live communications network.

* * * * *